US012639679B2

(12) United States Patent
Ma et al.

(10) Patent No.: US 12,639,679 B2
(45) Date of Patent: May 26, 2026

(54) CONTROL CIRCUIT OF LARGE DATA PROCESSING DEVICE SYSTEM FOR VIRTUAL CURRENCY AND LARGE DATA PROCESSING DEVICE FOR VIRTUAL CURRENCY

(71) Applicant: SHENZHEN MICROBT ELECTRONICS TECHNOLOGY CO., LTD., Shenzhen (CN)

(72) Inventors: Weibin Ma, Shenzhen (CN); Lihong Huang, Shenzhen (CN); Yang Gao, Shenzhen (CN)

(73) Assignee: SHENZHEN MICROBT ELECTRONICS TECHNOLOGY CO., LTD., Guangdong (CN)

( * ) Notice: Subject to any disclaimer, the term of this patent is extended or adjusted under 35 U.S.C. 154(b) by 311 days.

(21) Appl. No.: 17/910,212

(22) PCT Filed: Apr. 12, 2021

(86) PCT No.: PCT/CN2021/086502
§ 371 (c)(1),
(2) Date: Sep. 8, 2022

(87) PCT Pub. No.: WO2021/249003
PCT Pub. Date: Dec. 16, 2021

(65) Prior Publication Data
US 2023/0100033 A1 Mar. 30, 2023

(30) Foreign Application Priority Data
Jun. 12, 2020 (CN) .......................... 202021091262.0

(51) Int. Cl.
| | |
|---|---|
| *G06Q 20/06* | (2012.01) |
| *G06Q 20/38* | (2012.01) |
| *G06Q 20/40* | (2012.01) |

(52) U.S. Cl.
CPC ......... *G06Q 20/065* (2013.01); *G06Q 20/389* (2013.01); *G06Q 20/401* (2013.01)

(58) Field of Classification Search
CPC ... G06Q 20/389; G06Q 20/401; G06Q 20/065
See application file for complete search history.

(56) References Cited

U.S. PATENT DOCUMENTS

| | | | | |
|---|---|---|---|---|
| 10,224,957 | B1 * | 3/2019 | Cassetti | ............ G06F 16/24568 |
| 2018/0109391 | A1 | 4/2018 | He | |

FOREIGN PATENT DOCUMENTS

| | | | | | |
|---|---|---|---|---|---|
| CN | 107666387 | A | * | 2/2018 | ........... H04L 9/0643 |
| CN | 108681520 | A | * | 10/2018 | ......... G06F 15/7867 |

(Continued)

*Primary Examiner* — Courtney P Jones
*Assistant Examiner* — Davida Lee King
(74) *Attorney, Agent, or Firm* — Dickinson Wright PLLC

(57) ABSTRACT

A control circuit of a large data processing device system for virtual currency and a large data processing device for virtual currency using the control circuit. The control circuit includes: at least two co-controllers (12), each of the co-controllers (12) being in communication connection with one hashboard group (14), to communicate with the connected hashboard group (14) and control operation of the connected hashboard group (14); and a main controller (11) in communication connection with each of the co-controllers (12), to receive and submit tasks and perform, according to the received tasks, coordinated control and task allocation on each of the co-controllers (12), each of the hashboard groups (14) including at least one hashboard.

8 Claims, 2 Drawing Sheets

(56)        References Cited

FOREIGN PATENT DOCUMENTS

| | | | | | | |
|---|---|---|---|---|---|---|
| CN | 108693934 | A | | 10/2018 | | |
| CN | 110069434 | A | | 7/2019 | | |
| CN | 110826705 | A | * | 2/2020 | ............ | G06N 3/063 |
| CN | 212276396 | U | | 1/2021 | | |
| WO | WO-2017012371 | A1 | * | 1/2017 | .............. | G06F 1/26 |
| WO | WO-2020057180 | A1 | * | 3/2020 | .............. | G06F 1/26 |
| WO | WO-2020113451 | A1 | * | 6/2020 | .............. | G06F 9/44 |

* cited by examiner

CONTROL CIRCUIT OF LARGE DATA PROCESSING DEVICE SYSTEM FOR VIRTUAL CURRENCY AND LARGE DATA PROCESSING DEVICE FOR VIRTUAL CURRENCY

The present application is a National Stage Entry of International application No. PCT/CN2021/086502 filed on Apr. 12, 2021, which claims the priority to Chinese Patent Application No. 202021091262.0, filed on Jun. 12, 2020 and entitled "CONTROL CIRCUIT OF LARGE MINING MACHINE SYSTEM FOR VIRTUAL CURRENCY AND LARGE MINING MACHINE FOR VIRTUAL CUR-RENCY", which is incorporated in its entirety herein by reference.

TECHNICAL FIELD

The present application relates to the technical field of data processing devices for virtual currency, and in particular to a control circuit of a large data processing device system for virtual currency and a large data processing device for virtual currency.

BACKGROUND

In the technical field of virtual currency, a data processing device, such as a mining machine, is an electronic terminal product that earns virtual currency (such as Bitcoin) by solving problems through computing. As restricted by the technical requirements of blockchains, a mining machine is generally required to execute a massive amount of operations for possible reward (virtual currency) from the block-chain system, and it is increasingly difficult for the mining machine to mine over time, resulting in continuous upgrades of the mining machine. As the earliest mining machine, the traditional ordinary computer already failed to satisfy the demand of mining so long ago, and with the mining diffi-culty increasing, the mining machine specific to mining (a process of earning virtual currency) accordingly keeps upgrading the software and hardware in structure and on scale.

The basic structure of a mining machine principally includes a hashboard and a controller. One hashboard and one controller constitute a simplest basic structure of the mining machine, where the hashboard is configured to execute the computation process so as to execute the mining pool task, and the controller is configured to receive the mining pool task (the problem-solving task in the block-chain) from the outside (such as the Internet) and to submit the result of the mining pool task, which is obtained through the communication with the hashboard and the control. The increase in mining difficulty also leads to the increase in the difficulty of the mining pool task, with the increase in the number of the hashboards following. Generally, in a mining machine, a configuration in which one controller connecting to a number of hashboards has been a standard configura-tion. However, owing to an upper limit of the number of the hashboards that one controller can be connected to, it is impossible to further increase the hash rate once the number of the hashboards connected to the controller reaches the upper limit in the prior art.

SUMMARY

In view of the above, the present application provides a control circuit of a large data processing device system for virtual currency and a large data processing device for virtual currency, to realize coordinated control over a plu-rality of hashboards beyond what a single controller can control, thereby further improving a hash rate of the data processing device.

According to an aspect of the present disclosure, there is provided a control circuit of a large data processing device system for virtual currency, comprising at least two co-controllers, each of the co-controllers being in communication connection with one hash-board group, to communicate with the connected hash-board group and to control the operation of the con-nected hashboard group; and a main controller, the main controller being in commu-nication connection with each of the co-controllers, to receive and submit tasks and to perform, according to the received tasks, coordinated control and task allo-cation on each of the co-controllers.

According to another aspect of the present disclosure, there is provided a large data processing device for virtual currency using the control circuit of a large data processing device system for virtual currency described above.

It may be seen from the solution described above that, based on the control circuit of the large data processing device system for virtual currency and the large data pro-cessing device for virtual currency of the present applica-tion, a structure in which one main controller is in commu-nication connection with a plurality of co-controllers, and one of the co-controllers is in communication connection with a plurality of hashboards may be formed, therefore, the problem that the number of the hashboards is limited by the number of controller interfaces is solved, and coordinated control over the plurality of hashboards beyond what a single controller can control is realized, so that the large data processing device for virtual currency may increase the number of the hashboards, which is conducive to further increasing the hash rate in the single data processing device. In the case that total hash rates of mine fields are the same, the number of the large data processing devices for virtual currency implemented through the technical solution of the present application is far smaller than that of existing data processing devices, and the numbers of power cables, data cables, and network cables used are reduced along with a reduction in the number of the data processing devices used, thereby reducing routing complexity of the power cables, the data cables, and the network cables, facilitating elimi-nating safety hidden danger of a machine room of the data processing devices, and facilitating the maintenance of devices in the machine room of the data processing devices.

Figure 1:
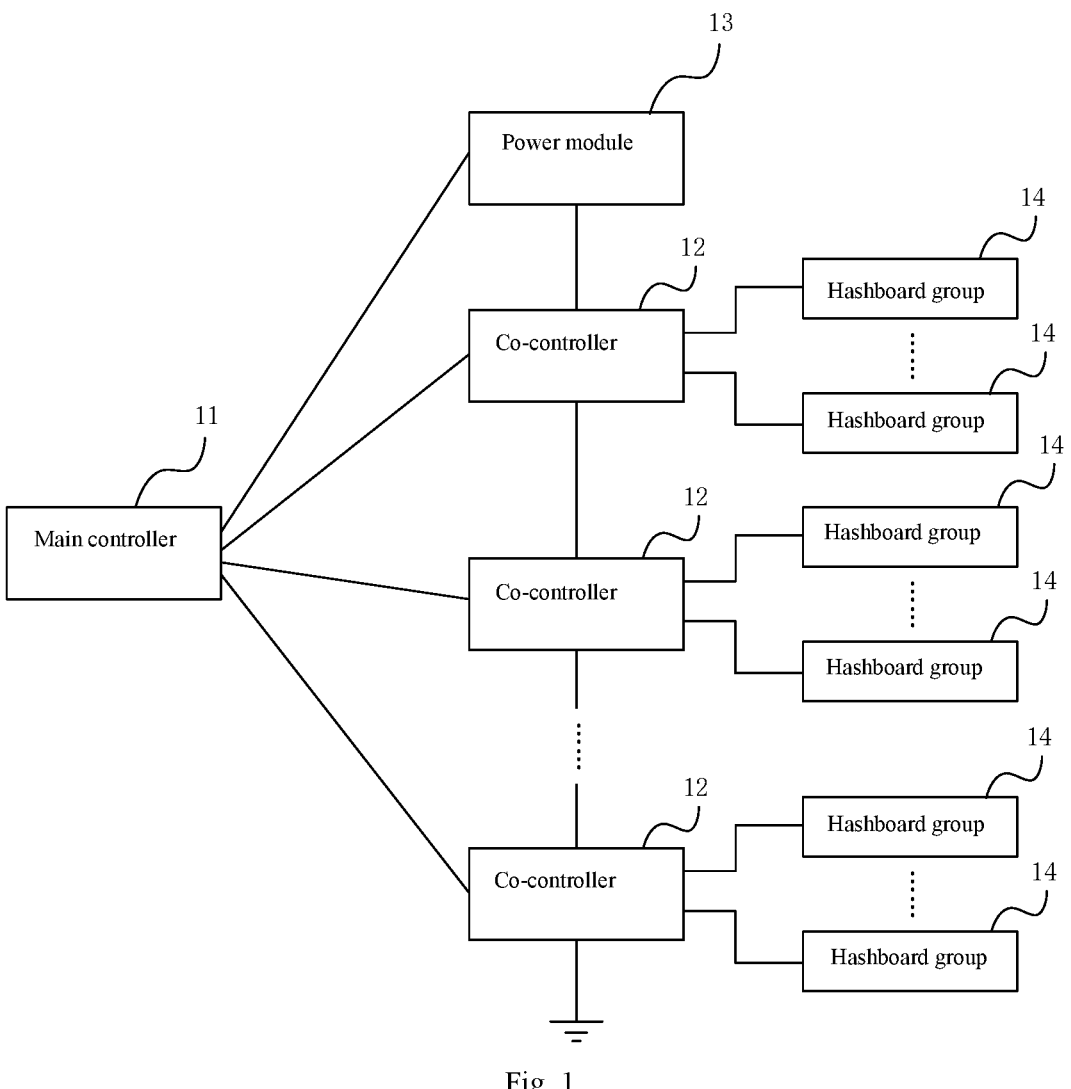
FIG. 1 is a schematic diagram of a control circuit of a large data processing device system for virtual currency in an embodiment of the present application.

In the drawings, all reference numerals denote compo-nents as follows:

11. Main controller

12. Co-controller

13. Power module

14. Hashboard
141. Hashboard group series circuit
142. Intra-hashboard-group parallel circuit

DETAILED DESCRIPTION OF THE EMBODIMENTS

For making the objectives, technical solutions and advantages of the present application clearer, the present application will be further described in detail below with reference to the drawings and taking example of the embodiments.

In embodiments of the present application, a data processing device may be referred to as, but is not limited to, a mining machine. As shown in FIG. 1, a control circuit of a large data processing device system for virtual currency in an embodiment of the present application principally includes a main controller 11 and at least two co-controllers 12. Each of the co-controllers 12 is in communication connection with one hashboard group 14, and the co-controller 12 is principally configured to communicate with the connected hashboard group 14 and to control operation of the connected hashboard group 14. The main controller 11 is in communication connection with each of the co-controllers 12, and the main controller 11 is principally configured to receive and submit tasks and to perform, according to the received tasks, coordinated control and task allocation on each of the co-controllers 12. In the embodiment, the tasks received and submitted by the main controller 11 may be, but are not limited to, mining pool tasks. The large data processing device system for virtual currency includes a plurality of hashboard groups 14, each of the hashboard groups 14 being composed of at least one hashboard.

Specifically, the co-controllers 12 are provided with communication ports in communication connection with the main controller 11 and the hashboard groups 14, respectively, the main controller 11 is provided with communication ports in communication connection with the co-controllers 12, the hashboard groups 14 are provided with communication ports in communication connection with the co-controllers 12, the main controller 11 is connected to communication ports of the co-controllers 12 through communication ports thereof, and the co-controllers 12 are connected to the communication ports of the hashboard groups 14 through communication ports thereof. In the co-controllers 12, the communication ports in the communication connection with the main controller 11 differ from the communication ports in the communication connection with the hashboard groups 14.

In the embodiment of the present application, the main controller 11 is principally configured to receive and submit the mining pool tasks, to be used for a principal decision-making algorithm, to perform the coordinated control over a plurality of co-controllers 12, and to avoid policy conflict between different co-controllers 12. In addition, in the embodiment, the main controller 11 is also used for a security mechanism and task allocation of the entire large data processing device system for virtual currency.

In the embodiment of the present application, the co-controllers 12 are principally configured for communication with the hashboards and control operation of the hashboards, and the co-controllers 12 only provide relevant operation instructions, while the main controller 11 is configured for control.

Further structures, operation processes, and specific execution methods inside the main controller 11 and the co-controllers 12 may be implemented with the prior art, such as existing computer software and hardware technologies, single-chip computers, integrated circuits, peripheral circuits, and related program technologies, etc., which will not be described in detail herein.

In the embodiment of the present application, the control circuit of the large data processing device system for virtual currency further includes a power module 13. The power module 13 is in communication connection with the main controller 11 and electrically connected to a co-controller series circuit, to supply, under the control of the main controller 11, power to the co-controller series circuit. The co-controller series circuit is formed by connecting at least two co-controllers 12 in series through power ports thereof.

Specifically, the power module 13 is provided with a control port and a power supply port. The control port of the power module 13 is connected to the main controller 11, and correspondingly, the main controller 11 is provided with a communication port in communication connection with the control port of the power module 13. Each of the co-controllers 12 is provided with power ports, the power ports including a power receiving port and a grounding port. In an embodiment of the co-controller series circuit, for two adjacent co-controllers 12, a grounding port of a former co-controller 12 is electrically connected to a power receiving port of a latter co-controller 12, a power receiving port of a first co-controller 12, closest to the power module 13, in the co-controller series circuit is electrically connected to the power supply port of the power module 13, and a grounding port of a last co-controller 12 farthest from the power module 13 is electrically connected to a general grounding end. In the embodiment, the general grounding end may be provided in the power module 13.

In the embodiment, the co-controllers 12 may adopt applications in the embedded type field and may operate embedded microcontroller units (MCUs) with a Linux system. For example, the co-controllers 12 may be chips of types such as Allwinner H3, H6, etc.

In the embodiment, the main controller 11 uses a processor having a plurality of network port interfaces and supporting the Linux system.

In the embodiment, the co-controllers 12 may be connected with the hashboard groups 14 through interfaces such as universal asynchronous receivers/transmitters (UARTs), serial peripheral interfaces (SPIs) or the like. That is, the communication ports for the communication connection between the co-controllers 12 and the hashboard groups 14 may be interfaces such as UARTs or SPIs.

In the embodiment, the co-controllers 12 may be connected with the main controller 11 through Ethernet ports. That is, the communication ports for the communication connection between the co-controllers 12 and the main controller 11 may be Ethernet ports.

In the embodiment of the present application, the plurality of co-controllers 12 adopt a series power supply structure, so that the power supply voltage of the power module 13 is correspondingly increased, which is conducive to the improvement of the efficiency of the power module 13, and in turn, the improvement of power efficiency is conducive to the further improvement of the hash rate of the large data processing device.

In the embodiment of the present application, the series power supply structure adopted by the co-controllers 12 will lead to different reference voltages (low-level voltages) of the co-controllers 12. For example, four co-controllers form the series power supply structure, and a single co-controller has a working voltage of 12 V. To ensure the normal working of the four co-controllers connected in series, the power supply voltage of the power module 13 should be increased to 48 V, and in this case, the reference voltages of the four co-controllers are 36 V, 24 V, 12 V and 0 V, respectively. In this case, when the co-controllers 12 are connected to the main controller 11 through the Ethernet ports, due to the action of voltage isolation of isolation transformers of the Ethernet ports, signal transmission between each of the co-controllers 12 and the main controller 11 may be realized without need to unify reference voltages among the co-controllers 12 and between each of the co-controllers and the main controller 11.

The series power supply structure adopted by the co-controllers 12 will lead to different reference voltages (low-level voltages) of the co-controllers 12. In this case, a reference voltage of a hashboard connected to each of the co-controllers 12 is required to be identical to the reference voltage of the correspondingly-connected co-controller 12.

To ensure that the reference voltage of the hashboard connected to each of the co-controllers 12 be identical to the reference voltage of the correspondingly-connected co-controller 12, the embodiment of the present application further provides an embodiment of a power supply circuit structure of hashboard groups 14. In the embodiment, each of the hashboard groups 14 includes at least one hashboard, the number of the hashboard groups 14 being equal to that of the co-controllers 12.

Figure 2:
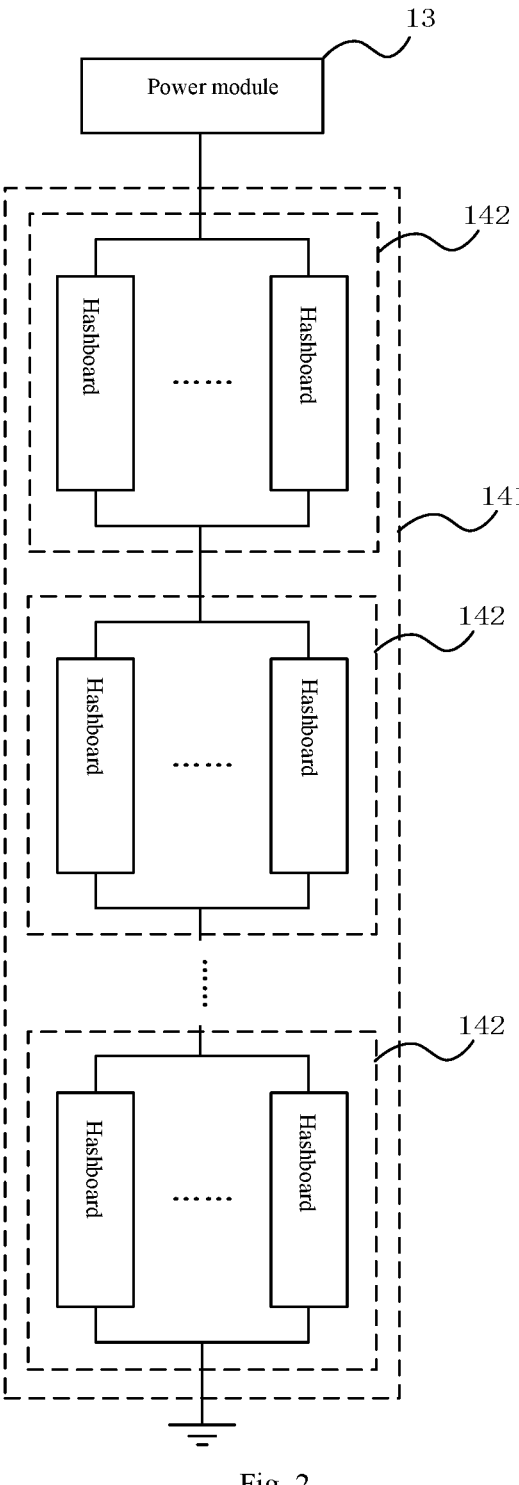
FIG. 2 is a structural schematic diagram of a power supply circuit of a hashboard in an embodiment of the present application.

As shown in FIGS. 1 and 2, all the hashboard groups 14 are connected in series through power ports thereof, to form a hashboard group series circuit 141, and hashboards in each hashboard group 14 are connected in parallel through power ports thereof, to form an intra-hashboard-group parallel circuit 142.

The power module 13 is further electrically connected to the hashboard group series circuit 141, to supply power to the hashboard group series circuit 141.

Specifically, the power ports of each of the hashboards include a power receiving port and a grounding port, inside each of the hashboard groups 14, the power receiving ports of all the hashboards are electrically connected together as a power receiving port of the hashboard group 14, and the grounding ports of all the hashboards are electrically connected together as a grounding port of the hashboard group 14, thereby forming the intra-hashboard-group parallel circuit 142.

In the hashboard group series circuit 141, for two adjacent intra-hashboard-group parallel circuits 142, a grounding port of a former intra-hashboard-group parallel circuit 142 is electrically connected to a power receiving port of a latter intra-hashboard-group parallel circuit 142, a power receiving port of a first intra-hashboard-group parallel circuit 142, closest to the power module 13, in the hashboard group series circuit 141 is electrically connected to the power supply port of the power module 13, and a grounding port of a last intra-hashboard-group parallel circuit 142 farthest from the power module 13 is electrically connected to the general grounding end.

In the embodiment, between each of the co-controllers 12 and the hashboard group 14 in communication connection therewith: a power receiving port of the co-controller 12 is electrically connected to the power receiving port of the hashboard group 14, and a grounding port of the co-controller 12 is electrically connected to the grounding port of the hashboard group 14.

It may be seen from the above embodiments that power supply circuits of each of the co-controllers 12 and the hashboard group 14 in communication connection therewith are in parallel connection, and power supply circuits of all the hashboards in each of the hashboard groups 14 are also in parallel connection, that is, power supply circuits of each of the co-controllers 12 and all the hashboards in communication connection therewith are in parallel connection. Such parallel connections ensure that the reference voltage of each of the co-controllers 12 is identical to that of the connected hashboards, so that each of the co-controllers 12 with the power supply circuits connected in series may effectively transmit signals with the hashboard group 14 in communication connection therewith.

In the embodiment, one main controller 11 is provided, and the number of the co-controllers 12 is not less than that of the main controller 11. In this way, a hardware connection foundation is provided for a system operation solution in which one main controller 11 coordinately controls a plurality of co-controllers 12, and one co-controller 12 controls the operation of a plurality of hashboards, and the bottleneck that the number of hashboards in one data processing device is limited by the controller in the prior art is broken through, so that it is feasible to provide a solution that the large data processing device for virtual currency is provided with more hashboards.

To ensure software safety protection of the entire large data processing device system for virtual currency, in the embodiment of the present application, the plurality of co-controllers 12 are not in direct communication with the outside, and all contents in communication with the outside pass through the main controller 11, so that only the interfaces of the main controller 11 are exposed to the outside, which reduces the risk caused by software vulnerability.

Based on the control circuit of a large data processing device system for virtual currency in the embodiment described above, the present application further provides a large data processing device for virtual currency, wherein the large data processing device for virtual currency uses the control circuit of a large data processing device system for virtual currency in the embodiment described above.

In the data processing device system, massive hashboards are provided, each of the hashboards needs a physical communication interface connected to the controller, and the controller also needs to prepare tasks for the hashboards, so that a massive quantity of controller resources are required to be consumed, a controller with a large computation amount and a plurality of interfaces is therefore required. However, the prior art lacks a controller with a large enough computation amount and sufficient interfaces. In the prior art, when a controller is fully connected to hashboards, if it is required to continue increasing a hash rate, the only way is to increase the number of data processing devices. with the solution used, as the number of the data processing devices is continuously increased, great challenges are brought to management and maintenance of the data processing devices, and the complexity of power cables, data cables, and network cables among massive data processing devices also brings hidden dangers to the safety of a machine room of the data processing devices. Once accidents such as electric leakage, water leakage, and fire disaster occur in the machine room of the data processing devices, the complex cables directly hinder the emergency repair of the data processing devices.

However, the technical solution to the present application uses a constituted structure in which one main controller is connected with a plurality of co-controllers, and one co-controller is connected with a plurality of hashboards, to solve the limitation described above, to realize the coordinated control over the plurality of hashboards beyond what a single controller can control, and further to increase the number of the hashboards in the large data processing device for virtual currency, which is conducive to increasing the hash rate of the single data processing device. In the case that total hash rates of mine fields are the same, the number of the large data processing devices for virtual currency of the present application used is far smaller than the number of existing data processing devices used, and the numbers of the power cables, the data cables, and the network cables used are reduced along with a reduction in the number of the data processing devices used, thereby reducing the complexity of the power cables, the data cables, and the network cables, facilitating eliminating the safety hidden danger of the machine room of the data processing devices, and facilitating the maintenance of devices in the machine room of the data processing devices.

What is described above is merely the preferred embodiments of the present application, and is not intended to limit the present application, and any modifications, equivalent replacement, improvements, etc. made within the spirit and principle of the present application should all fall within the scope of protection of the present application.

What is claimed is:

1. A control circuit of a large data processing device system for virtual currency, comprising:

at least two first processor circuits, each of the first processor circuits being in communication connection with one hashboard group, to communicate with the connected hashboard group and to control the operation of the connected hashboard group;

a second processor circuit, the second processor circuit being in communication connection with each of the first processor circuits, to receive and submit tasks and to perform, according to the received tasks, coordinated control and task allocation on each of the first processor circuits; and a power supply circuit, the power supply circuit being in communication connection with the second processor circuit, and being electrically connected to a first processor circuit series circuit, to supply, under the control of the second processor circuit, power to the first processor circuit series circuit;

wherein the first processor circuit series circuit is formed by connecting the at least two first processor circuits in series through power ports thereof, and wherein the first processor circuits are in communication connection with the second processor circuit through respective Ethernet ports and are voltage-isolated by isolation transformers of the Ethernet ports, eliminating the need to unify reference voltages among the first processors and between each of the first processors and the second processor circuit.

2. The control circuit of the large data processing device system for virtual currency according to claim 1, wherein the first processor circuits are embedded microcontroller units (MCUs).

3. The control circuit of the large data processing device system for virtual currency according to claim 1, wherein the first processor circuits are in communication connection with the hashboard groups through universal asynchronous receivers/transmitters (UARTs) interfaces or serial peripheral interfaces (SPIs).

4. The control circuit of the large data processing device system for virtual currency according to claim 1, wherein each of the hashboard groups comprises at least one hashboard.

5. The control circuit of the large data processing device system for virtual currency according to claim 4, wherein all the hashboard groups are connected in series through power ports thereof, to form a hashboard group series circuit; and the hashboards in each of the hashboard groups are connected in parallel through power ports thereof, to form an intra-hashboard-group parallel circuit.

6. The control circuit of the large data processing device system for virtual currency according to claim 5, wherein the power supply circuit is further electrically connected to the hashboard group series circuit, to supply power to the hashboard group series circuit.

7. The control circuit of the large data processing device system for virtual currency according to claim 6, wherein between each of the first processor circuits and the hashboard group in communication connection therewith:

a power receiving port of power ports of the first processor circuit is electrically connected to a power receiving port of power ports of the hashboard group; and a grounding port of the power ports of the first processor circuit is electrically connected to a grounding port of the power ports of the hashboard group.

8. A large data processing device for virtual currency, comprising:

a control circuit, comprising:

at least two first processor circuits, each of the first processor circuits being in communication connection with one hashboard group, to communicate with the connected hashboard group and to control the operation of the connected hashboard group;

a second processor circuit, the second processor circuit being in communication connection with each of the first processor circuits, to receive and submit tasks and to perform, according to the received tasks, coordinated control and task allocation on each of the first processor circuits; and a power supply circuit, the power supply circuit being in communication connection with the second processor circuit, and being electrically connected to a first processor circuit series circuit, to supply, under the control of the second processor circuit, power to the first processor circuit series circuit; wherein the first processor circuit series circuit is formed by connecting the at least two first processor circuits in series through power ports thereof, and wherein the first processor circuits are in communication connection with the second processor circuit through respective Ethernet ports and are voltage-isolated by isolation transformers of the Ethernet ports, eliminating the need to unify reference voltages among the first processors and between each of the first processors and the second processor circuit.

* * * * *